United States Patent Office 3,509,194
Patented Apr. 28, 1970

3,509,194
1,3-DISILYL-1,3,2-DIAZASILACYCLOALKANES AND PROCESS OF PREPARING
Walter Fink, Zurich, Switzerland, assignor to Monsanto Company, St. Louis, Mo., a corporation of Delaware
No Drawing. Filed July 8, 1966, Ser. No. 563,693
Int. Cl. C07d 103/02
U.S. Cl. 260—448.2
9 Claims

ABSTRACT OF THE DISCLOSURE 1,3-disilyl-1,3-2-diazasilacycloalkanes of formula

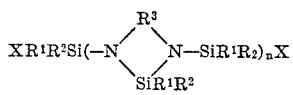

and process for making by (step 1) reacting a diamine of formula $H_2N-R^3-NH_2$ with a halosilane of formula $R^1R^2SiX_2$ using less silane than needed in final product and then heating at a higher temperature to finish step 1 of the reaction, and (step 2) of adding the balance of the halosilane and heating to complete the reaction. These compounds find utility as heat exchangers, lubricants and oil additives.

---

The present invention relates to novel 1,3-disilyl-1,3,2-diazasilacycloalkanes and process for preparing. The new process allows the preparation of compounds of the formula (I) 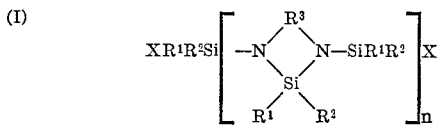

in which $R^1$ and $R^2$, when taken singly, represent hydrogen atoms, fluorine atoms, identical or different, possibly substituted and/or ethylenically or acetylenically unsaturated hydrocarbon groups, heterocyclic groups or silyl groups, which can also be attached through an oxygen atom, $R^1$ and $R^2$, when taken together, represent with their silicon atom a possibly substituted heterocyclic ring, $R^3$ represents a possibly substituted and/or ethylenically or acetylenically unsaturated divalent hydrocarbon group, heterocyclic group, an ether group attached through a carbon atom or a corresponding group which shows S, SS, NH, NR (R=organic group occurring in amines), $SiR'_2$, $NSiR'_3$ (R'=organic group occurring in silanes), SO or $SO_2$ in the place of the etheric oxygen atom, which group $R^3$ has attached the two nitrogen atoms of the diazasilacycloalkane ring in 1,2- or 1,3-position or ortho- or peri-position, respectively, X represents a chlorine atom or bromine atom, and $n$ stands for an integer of 1 to 10. Normally the R groups will have not more than 20 carbon atoms, usually not more than 8 carbon atoms.

It has previously been known that one obtains from e.g. ethylene diamine and dimethyldichlorosilane in a molar proportion of 1:1 in a benzene solution at low temperatures the corresponding 1,3-bis(dimethylchlorosilyl)-2,2-dimethyl - 1,3 - diaza-2-sila-cyclopentane in 60% yield besides 15.6% of polymeric residue. It has further been known that from the indicated reaction components in a molar proportion of 2:1 there is formed under the same conditions a linear polymer with the supposed structure $[-Si(CH_3)_2-NHCH_2CH_2NH-]$. (E. G. Rochow, Mh. Chem. 95, 750 (759) 1964). This polymer is unstable and releases even at room temperature and quicker at 400° C. in vacuum ethylene diamine, whereby a further condensation occurs. A large quantity of the first mentioned monomer is formed as by-product in its preparation. With these hitherto known processes it is not possible to prepare defined uniform products.

It has now been found that one obtains the compounds I, when a diamine of the general formula (II)    $H_2N-R^3-NH_2$ in which $R^3$ is defined as before, and a halosilane of the general formula (III)    $R^1R^2SiX_2$ in which $R^1$, $R^2$ and X are defined as before, are reacted first in a molar proportion insufficient with respect to the halosilane and preferably about 1:0.5, in an inert solvent, if necessary by applying pressure, at a temperature lying below 100° C., e.g. at 25° C., the reaction mixture is subsequently heated at a higher temperature than that employed first, e.g. 60° to 130° C., for some time, e.g. at least about 10 minutes, then the missing quantity of halosilane which is theoretically necessary to reach the desired grade of oligomerization is added to the solution which may be cooled during the addition and then heated, possibly without a solvent, at least if high temperatures are used, e.g. 60° to 250° C. can be used in the heating step in order to complete the reaction.

In the first reaction step an essentially linear polymer of the formula $$[-Si(R^1R^2)NH-R^3-NH-]$$

is formed, which may also contain a certain amount of cyclic units. If the halosilane is very reactive, such as e.g. a lower dialkyldichlorosilane, this reaction is suitably carried out at low temperatures, e.g. at 0° to room temperature. The reaction mixture then has to be heated now up to a higher temperature for some time, before a further amount of the halosilane III can be added. In general it is sufficient to heat the reaction mixture at 80° C. for about one hour. It is also possible to heat for a longer time at a lower temperature, e.g. 60° C./3 hours, or for a shorter time at a higher temperature, e.g. 130° C./10 minutes. If this subsequent heating is omitted, one obtains principally the monomer and not the desired oligomers. The diamine II and the halosilane III are now present in the reaction mixture in a molar proportion of e.g. 1:0.5, and half the quantity of diamine has been utilized for the binding of the hydrochloric acid which was split off during the reaction. Alternatively, it is possible that for this purpose a suitable quantity of another acid-binding agent can be added instead of the diamine. Tertiary amines, such as trimethylamine, triethylamine, pyridine etc., whose chlorohydrates catalyze the subsequent reaction, are preferred.

In the second reaction step more of the halosilane is added, and on further heating the formation of cyclic units in the polymer is effected by simultaneous degradation of the chain according to the scheme

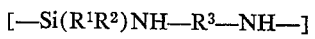
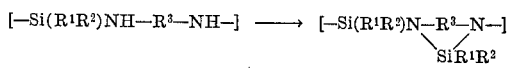

This second reaction heating step normally is carried out at temperatures of about 80° to 200° C. Depending on the applied temperature the heating period may be about 10 minutes to several hours. An additional quantity of the originally employed diamine is used for the binding of the hydrochloric acid cleaved off. Because this diamine is only available from the polymer, this subsequent reaction is restrictedly coupled with the decomposition of the polymer, that is with a shortening of the silazane chain. In consequence thereof the process of invention is especially suited for the preparation of short-chain oligomeric 1,3 - disilyl - 1,3,2 - diazasilacycloalkanes containing in each terminal exocyclic silyl group a chlorine or bromine atom.

With the previously known processes such oligomers could not be produced.

When the halosilane III is less reactive, such as e.g. diphenyldichlorosilane, higher temperatures are employed. The first reaction step can occur at e.g. 50 to 100° C. and the completion of the reaction at e.g. 200° to 250° C. The upper temperature limit is defined by the decomposition point of the formed endproduct. This decomposition point may be with the more resistant types between about 300° and 400° C. In order to reach the higher temperatures necessary in some cases for the completion of the reaction, it may be expedient to remove the solvent.

When the halosilane to be reacted has a low boiling point, e.g. less than 60° C., it may be advantageous to carry out the reaction under pressure. Instead of the low boiling halosilanes such as difluorodichlorosilane, dichlorodihydrogenosilane, methylfluorodichlorosilane and methylhydrogenodichlorosilane, there can be used also the corresponding higher boiling bromides. As a rule, these are more reactive than the chlorides.

The quantity halosilane III exceeding the preferred proportion of 1:0.5, which should be added in the second reaction step, can be calculated based on one mole of the diamine put into the reaction, by means of the formula $$\frac{0.5n+1}{3n}$$

and the total quantity of the necessary amount of halosilane by means of the formula $$\frac{2n+1}{3n}$$

In order to obtain the valuable oligomers consisting of a principal fraction having $n=2$ to 10, the hereafter indicated molar proportions may be observed:

| n | Diamine, total | Halosilane First step | Halosilane Second step | Total |
|---|---|---|---|---|
| 2 | 1 | 0.5 | 0.333 | 0.833 |
| 3 | 1 | 0.5 | 0.277 | 0.777 |
| 4 | 1 | 0.5 | 0.250 | 0.750 |
| 5 | 1 | 0.5 | 0.233 | 0.733 |
| 6 | 1 | 0.5 | 0.222 | 0.722 |
| 7 | 1 | 0.5 | 0.214 | 0.714 |
| 8 | 1 | 0.5 | 0.208 | 0.708 |
| 9 | 1 | 0.5 | 0.2037 | 0.7037 |
| 10 | 1 | 0.5 | 0.2000 | 0.7000 |

Generally the fractions adjacent to the principal fraction are also present in the resulting endproducts, so that different oligomers are normally present in the endproduct. In a batch according to $n=5$ the monomer product is not made in substantial amount. The endproducts can be separated into uniform products by distillation in many cases. The resulting mixtures can, however, also directly be used.

The first reaction step is usually carried out in an inert solvent. Suitable solvents are especially aliphatic, cycloaliphatic, aromatic and hydroaromatic hydrocarbons, such as hexane, octane, cyclohexane, benzene, toluene, xylene, biphenyl, terphenyl, 1 - methylnaphthalene, 2 - methylnaphthalene, decalin, tetralin and the like. The second reaction step requiring higher temperatures may be expediently be carried out without a solvent.

For the preparation of the products of invention there may be utilized diamines showing two aminogroups either on an aliphatic chain in 1,2- or 1,3-position or on a ring in ortho-position, or on a polynuclear ring in periposition.

With the aliphatic representatives, the bivalent group $R^3$ can therefore be derived from one of the following hydrocarbons: ethane, propane, butane, pentane, hexane, heptane, octane, nonane, decane, undecane, dodecane, and higher analogues having up to 20 carbon atoms. These alkylenes may show as substituents alkyls, aralkyls and aryls, that is branched aliphatic diamines e.g. 1,2-diamino-2 - methyl - propane, 2,3 - diamino - 2 - phenyl - butane, 3,4 - diamino - 3,4 - dimethylhexane, 4,4 - bis - amino-methyl - heptane, 5 - amino - 4 - aminomethyl - nonane, 2,4 - diphenyl - 6,6 - bis - aminomethyl - octane and the like.

Besides the two amino groups necessary for the cyclization there can also be present in another place on the aliphatic chain tertiary amino groups, such as e.g. dimethylamino, diethylamino, di-n-propylamino, di-iso-propylamino, diallylamino, di-n-butylamino, di-iso-butylamino, di-sec-butylamino, di-tert-butylamino, di-3-butenylamino, di-2-butenylamino, di-n-amylamino, di-iso-octylamino, di-dodecylamino, dicyclohexylamino, dicyclohexenylamino, dibenzylamino, diphenylamino, ditolylamino, bis(biphenylyl)amino, bis(p - methoxyphenyl)amino, bis(m - phenoxyphenyl)amino, bis(m - trifluormethylphenyl)amino, N,N,N'-triphenylbenzidino, pyrrolino, pyrrolidino, pyrazolino, piperidino, morpholino, thiazino, N - trimethylsilyl-piperazino, tetrahydroquinolino or decahydroquinolino.

Examples for simplest representatives of triamines and tetramines are 1,2,3 - triaminopropane, 1,2,3 - triamino-2 - methylpropane, 1,1,1 - tris - aminomethyl - ethane, 1,2,3 - triamino - 2 - phenyl propane and the like. As the expert easily will recognize, corresponding bicyclic endproducts can be obtained if four amino groups are present, provided both pairs are in the defined position, such as e.g. in tetraminoneopentane and 1,2,3 - triamino - 2 - aminomethylpropane. It is clear that in such cases the quantity of the halosilane III to be reacted should be greater.

Further suitable diamines have a cyclic character and contain the amino groups in ortho position. The cycloaliphatic representatives may be derived from cyclobutane, cyclopentane, cyclohexane, bicyclopentane, bicyclohexane, spiro-[5,4]-decane etc.

Suitable aromatic diamines are based on benzene, toluene, xylene, naphthalene, 1-methylnaphthalene, 1,4-dimethylnaphthalene, phenanthrene, anthracene, acenaphthene, acenaphthylene, diphenyl, diphenylmethane, triphenylmethane, tetraphenylmethane, dinaphthyl, diphenylamine, triphenylamine, phenyl-trimethylsilane, diphenyldimethylsilane, triphenyl-methylsilane, tetraphenylsilane, diphenyloxide, diphenylsulfide, diphenylsulfone, diphenylsulfoxide and the like.

Suitable heterocyclic diamines are based on pyrrole, pyrroline, pyrrolidine, furane, tetrahydrofurane, thiophene, pyrazole, pyrazoline, pyrazolidine, imidazole, imidazoline, imidazolidine, benzimidazole, thiazole, oxazole, triazole, benzotriazole, pyrrole, pyrroline, pyrrolidine, pyrane, pyridine, thiopyrane, piperidine, piperazine, morpholine, triazine, indazole, quinoline, quinazoline, quinoxaline, phenazine, carbazole and the like. Included are the derivatives, which are alkylated, phenylated or silylated at the nitrogen atom of the heterocyclic ring.

From the cyclic diamines also those are utilizable which contain in ortho position an amino group and an α-aminoalkyl group, such as e.g. ortho-aminobenzylamine, 1-amino - 2 - α-aminoethyl-cyclohexane and 1-amino-2-α-aminopropylbenzene.

Moreover are also utilizable diamines, which contain the two amino groups in peri position, such as e.g. 1,8-diaminonaphthalene, 1,8-diaminodecalin, 1,9-anthracene, 4,5-quinoline and 1,9-carbazole.

Besides the tertiary amino groups other substituents can be: halogen (e.g. 1,3-diamino-2-chloropropane, 1,2-diamino-4-chlorobenzene, 4,5 - diamino-2-chloropyrimidine, 2,3-diamino - 5 - (resp.6-)chloropyridine, 2,3-diamino-4,5-(resp.5,6) dichloropyridine etc.), oxygen (e.g. diaminoacetone, diaminoacetophenones, diaminobenzophenones), sulfur (e.g. diaminothioketones), SO (e.g. diaminosulfoxide) and $SO_2$ (e.g. diaminosulfones).

A further diazasilacycloalkane group can be present as substituent or be formed in the reaction.

Especially temperature resistant endproducts having a high boiling point contain a bivalent group $R^3$ derived from one of the following compounds: phenoxybenzene, toloxybenzene, 2-biphenylylether, 3-biphenylylether, 4-biphenylylether, 2-biphenylyl-4-biphenylylether, 3-biphenylyl-4-biphenylylether, 1 - (2-biphenylyloxy)-2-phenoxybenzene, 1 - ( 2 biphenylyloxy)-3-phenoxybenzene, 1-(2 - biphenylyloxy) - 4 - phenoxybenzene, 1-(3-biphenylyloxy) - 2 - phenoxybenzene,1 - (3 - biphenylyloxy)-3-phenoxybenzene, 1-(3 - biphenylyloxy) - 4 - phenoxybenzene, 1 - (4 - biphenylyloxy)-2-phenoxybenzene, 1-(4-biphenylyloxy) - 3 - phenoxybenzene, 1-(4-biphenylyloxy-4 - phenoxybenzene), 2,2' - diphenoxy-biphenyl, 3,3'-diphenoxybiphenyl, 4,4'-diphenoxybiphenyl, 2,3'-diphenoxybiphenyl,2,4'-diphenoxybiphenyl, 3,4'-diphenoxybiphenyl, 2,4 - diphenoxybiphenyl, 2,5 - diphenoxybiphenyl, 2,6-diphenoxybiphenyl, 3,4 - diphenoxybiphenyl, 3,5 - diphenoxybiphenyl, 1,2,3-triphenoxybenzene, 1,2,4-triphenoxybenzene, 1,3,5-triphenoxybenzene, 2-phenoxyphenylether, 3 - phenoxyphenylether, 4 - phenoxyphenylether, 2-phenoxyphenyl - 3 - phenoxyphenylether, 2-phenoxy - 4' - phenoxyphenylether, 3 - phenoxyphenyl - 4' - phenoxyphenylether, 1 - phenoxynaphthalene, 2 - phenoxynaphthalene, 1,1' - dinaphthaleneether, 2,2' - dinaphthalene ether, 1,2-dinaphthalene ether etc., moreover longer chain polyaroxyaryls ArO(ArO)$_a$Ar, wherein Ar signifies a phenyl biphenylyl or naphthyl group, or phenylene, biphenylylene or naphthylene group, resp., which can have lower alkyl (not more than 8 carbon atoms) substituents, biphenyl or naphthyl and $a$ is an integer of 1 to 10. The aroxy groups may be found in ortho, para or meta position with respect to the nitrogen atoms of the diamine. In the enumerated aryl groups fluorine atoms may be substituted for one to several hydrogen atoms, whereby the liquid range of the endproducts can be increased. Included are the corresponding sulfur ethers, which contain sulfur instead of oxygen.

Examples for the groups $R^1$ and $R^2$, as they may occur in halosilanes III linked to the silicon, are: alkyls, alkenyls, and alkynyls such as methyl, ethyl, vinyl, ethynyl, n-propyl, iso-propyl, allyl, propenyl, iso-propenyl, propargyl, propynyl, n-butyl, iso-butyl, sec-butyl, tert-butyl, methallyl, 1-butenyl, crotyl, 3-butenyl, butadienyl, 1-butynyl, 2-butynyl, 3-butynyl, 1-buten-2-ynyl and higher aliphatic rests having up to 24 carbon atoms such as undecenyl, dodecyl, myristyl, oleyl, tetracosyl; moreover cycloalkyls and cycloalkenyls and cycloalkynyls such as cyclobutyl, cyclopentyl, cyclopentenyl, cyclopentadienyl, cyclohexyl, cyclohexenyl, cyclohexadienyl, cyclohexynyl and greater alicyclic rests such as cyclooctyl, cyclooctatrienyl, cyclododecyl, cyclododecatrienyl, bicyclohexyl; moreover aralkyls, aralkenyls and aralkynyls such as benzyl, cuminyl, phenylethyl, styryl, phenylethynyl, phenylpropyl, 1-phenylallyl, 2-phenylallyl, cinnamyl, phenylpropynyl, 1-phenylpropargyl, 3-phenylpropargyl, diphenylmethyl, triphenylmethyl, α-naphthylmethyl, β-naphthylmethyl, 1-α-naphthylethyl, 2-α-naphthylethyl, 1-β-naphthylethyl, 2-β-naphthylethyl, 1-α-naphthylethenyl, 2-α-naphthylethenyl, 1-β-naphthylethenyl, 2-β-naphthylethenyl, α - naphthylethynyl, β - naphthylethynyl; moreover alkaryls, alkenylaryls and alkynylaryls such as tolyl, xylyl, mesityl, duryl, ethylphenyl, cumyl, vinylphenyl, ethynylphenyl, propargylphenyl, propynylphenyl, tert-butylphenyl, α-vinylnaphthyl, β-vinylnaphthyl, α-ethynylnaphthyl, β-ethynylnaphthyl; moreover aryls such as phenyl, o-biphenylyl, m-biphenylyl, p-biphenylyl, m-terphenylyl, p-terphenylyl, 1-naphthyl, 2-naphthyl, 2-anthryl, 9-anthryl, 1-phenanthryl, 2-phenanthryl, 3-phenanthryl, 4-phenanthryl, 9-phenanthryl, indanyl, indenyl; moreover possibly N-substituted heterocyclic rests such as pyrryl, furyl, tetrahydrofuryl, benzofuryl, thienyl, pyrrolinyl, pyrrolidyl, pyrazolyl, pyrazolinyl, pyrazolidyl, imidazolyl, imidazolidyl, benzimidazolyl, thiazolyl, oxazolyl, iso-oxazolyl, triazolyl, pyrazinyl, pyrimidyl, pyridazinyl, pyridyl, pyranyl, thiopyranyl, piperidyl, morpholinyl, thiazinyl, triazinyl, quinolyl, quinazolyl, quinoxalyl, indolyl, carbazolyl and the like.

These organic groups can also be attached through an oxygen atom to the silicon atom.

It has been found that the enumerated hydrocarbon groups and heterocyclic groups can show substituents which do not hinder the reaction of invention.

Examples of such substituents are chlorine, bromine, fluorine and iodine atoms, organic groups which are attached through an oxygen atom or sulfur atom, cyano groups, nitro groups, silyl groups and tertiary amino groups.

Examples of some simple representatives of the great class of halogenated hydrocarbon rests are: chloromethyl, dichloromethyl, trichloromethyl, bromomethyl, dibromomethyl, tribromomethyl, fluoromethyl, 1-chloroethyl, 2-chloroethyl, 1-bromoethyl, 2-bromoethyl, 1-fluoroethyl, 2-fluoroethyl, 1,2-dichloroethyl, 1,2-difluoroethyl, 2-trichloroethyl, 2-trifluoroethyl, pentafluoroethyl, 2-chlorovinyl, 1-chlorovinyl, 1,2-dichlorovinyl, trichlorovinyl, trifluorovinyl, bromophenyl, fluorophenyl, difluorophenyl, trifluorophenyl, pentafluorophenyl, trichloromethylphenyl and bis(trifluoromethyl)-phenyl. Also other hydrocarbon groups cited before can be halogenated.

Examples of substituents comprising an organic group which is attached through an oxygen or sulfur atom will become evident upon consulting the organic groups, which hereinabove have been mentioned.

Further substituents consist of recurring branched or straight-chain ether groupings such as methoxymethyleneoxy, methoxyethyleneoxy, ethoxyethyleneoxy, tert-butoxy-tert-butyleneoxy, veratroxy, anisoxy, 3,4-dimethoxyphenyloxy, 3-phenoxy-4-methoxyphenenyloxy, and purely aromatic groups which have been enumerated before or defining the group $R^3$.

Moreover, substituents resulting from the addition of formaldehyde, ethylene oxide or propylene oxide to a hydroxyl group and subsequent etherification, esterification or otherwise blocking of the terminal hydroxyl group. They correspond to the formulae —O(CH$_2$O)$_a$CH$_2$OQ, —O(CH$_2$CH$_2$O)$_a$CH$_2$CH$_2$OQ or —O(CH$_2$CH$_2$CH$_2$O)$_a$CH$_2$CH$_2$CH$_2$OQ (Q=terminal hydroxyl group blocking group as usual in such chains; $a$=1–10).

According to the definition of $R^1$ and $R^2$ these alkoxy and aroxy groups can also be attached directly to the silicon atom. Moreover, one of several of the hydrogen atoms can be replaced by fluorine atoms, whereby the liquid range of the endproducts can be increased.

Examples of some simplest representatives of the class of cyanated and nitrated rests are 2-cyanoethyl, 2-nitroethyl, 2-cyano-n-propyl, 3-cyano-n-propyl and 2,4-dicyano-n-butyl. Instead of the cited hydrocarbon groups other groups such as have been enumerated for $R^1$ and $R^2$ may be found and the possibilities of combination will become evident to those skilled in the art.

The groups $R^1$ and $R^2$ can also be silyl groups. The term "silyl group" should herein be understood in its broadest sense and comprises at least the groupings SiR*$_3$, SiR*$_2$SiR*$_3$, SiR*$_2$OSiR*$_3$, Si(SiR*$_3$)$_2$R*, Si(OSiR*$_3$)$_2$R*, Si(SiR*$_3$)$_3$ and Si(OSiR*$_3$)$_3$ (R*=hydrogen atom, fluorine atom and/or organic group, possibly atached via O instead of C). It is quite clear to those skilled in the art that especially the silyl groups which contain two or more silicon atoms, as a rule, will not contain exclusively fluorine or hydrogen atoms, but rather show a combination with organic groups. These groups are represented by the symbol R' as set forth below.

Examples for some silyl groups of the general formula SiR'$_3$ are: trimethylsilyl, triphenylsilyl, trimethoxysilyl, triphenoxysilyl, dimethoxy-phenoxysilyl, methoxy-diphenoxysilyl, methyl-dimethoxysilyl, dimethyl methoxysilyl, phenyl - dimethoxysilyl, methyl - diphenoxysilyl, methylphenyl-methoxysilyl, methyl-phenyl-phenoxsilyl etc., including silyl groups in which Si is a constituent of the heterocyclic ring as in the rests 1-silacyclopentyl, 1-silacyclopentenyl, 1-silacyclohexyl, 1-silacyclohexenyl, 1-silycyclohexadienyl etc., moreover fluorosilyl groups of the general formulae $SiF_3$, $SiF_2R'$, and $SiFR'_2$, such as trifluorosilyl, methyldifluorosilyl, dimethylfluorosilyl, phenyldifluorosilyl, diphenylfluorosilyl, methyl - phenylfluorosilyl, methoxyfluorosilyl, dimethoxyfluorosilyl, methoxy - phenoxyfluorosilyl, methoxy - phenylfluorosilyl, phenoxy-methylfluorosilyl etc., moreover hydrogenosilyl groups of the general formulae $SiH_3$, $SiH_2R'$, $SiHR'_2$, $SiHFR'$, $SiHF_2$, such as trihydrogenosilyl, methyldihydrogenosilyl, dimethylhydrogenosilyl, phenyldihydrogenosilyl, diphenyldihydrogenosilyl, methyl - phenylhydrogenosilyl, methoxydihydrogenosilyl, dimethoxyhydrogenosilyl, phenoxydihydrogenosilyl, diphenoxyhydrogenosilyl, methoxyphenoxyhydrogenosilyl, methoxy - phenylhydrogenosilyl, phenylfluorohydrogenosilyl etc. Instead of methyl, phenyl, methoxy or phenoxy, other analogous silyl groups contain other organic groups such as have been enumerated for $R^1$ and $R^2$.

According to the definition of $R^1$ and $R^2$ given at the beginning these silyl groups can also be attached through an oxygen atom.

The simplest representatives of substituents having Si—Si- or Si—O—Si-bonds are pentamethyldisilanyl, 1-trimethylsilyltetramethyldisilanyl, 1 - bis - (trimethylsilyl)-trimethyldisilanyl, pentamethoxydisilanyl, pentamethoxydisiloxanyl, 1-trimethoxysilyltetramethoxydisiloxanyl, and 1 - bis(trimethoxysilyl)trimethoxydisiloxanyl. Analogous substituents contain instead of methyl, possibly partially, other organic groups such as have been enumerated for $R^1$ and $R^2$, hydrogen atoms or fluorine atoms. According to the definition set forth at the beginning also these disilanyl and disiloxanyl groups can be attached directly to the silicon atoms of the diazasilacycloalkane ring.

The silyl groups can also be found as substituents on the hydrocarbon groups or heterocyclic groups.

The products of invention are valuable intermediate products, because the halogen atoms which are at the ends of the chain may be replaced in known manner for numerous organic groups. On selecting the corresponding groups in the initial compounds and for the exchange of the halogen atoms in the end products one can obtain products, which are liquid and extremely temperature resistant in a wide temperature range. The products of invention, in which X is a fluorine atom, can be utilized directly as high temperature resistant liquids for hydraulic oils, heat exchangers, lubricants and oil additives.

Also directly utilizable are the higher molecular weight endproducts. The chlorine atoms at the end of the chain can be exchanged by hydrolysis with water or with an aqueous organic solvent for hydroxy groups.

On heating, possibly in the presence of a solvent which forms with water an azeotrope, these derivatives, especially the low oligomers, can be condensed further more into higher molecular products.

EXAMPLE 1

To 120.1 g. (2 moles) of ethylene diamine dissolved in 1000 ml. of benzene are added by drops at room temperature 129 g. (1 mole) of dimethyldichlorosilane. Then the reaction mixture is refluxed for one hour, cooled, 85.1 g. (0.66 mole) of dimethyldichlorosilane are added at once and the reaction mixture is refluxed for another hour. After having filtered off the chlorohydrate the benzene is distilled off under reduced pressure and the residue is fractionally distilled in the vacuum.

One obtains four fractions (average of 2 runs):

(I) 19.9 g. 1,3 - bis(dimethylchlorosilyl) - 2,2 - dimethyl - 1,3 - diaza - 2 - sila - cyclopentane; B.P. 87–90° C./0.1 mm.

(II) 46.4 g. dimeric product; B.P. 148–150° C./0.05 mm., colorless easily movable oil, $n_D^{20}$ 1.4819.

Analysis.—$C_{14}H_{38}N_4Si_5Cl_2$ calc'd (percent): C, 35.49; H, 8.08; N, 11.82; Cl, 14.96; mol weight 473.85. Found (percent): C, 35.94; H, 7.93; N, 11.62; Cl, 14.40; mol weight 452 (benzene).

(III) 18.0 g. trimeric product; B.P. 225–227° C./0.1 mm., slightly yellow, movable oil, $n_D^{20}$ 1.4878.

Analysis.—$C_{20}H_{54}N_6Si_7Cl_2$ calc'd (percent): C, 37.17; H, 8.42; N, 13.00; Cl, 10.97; mol weight 646.24. Found (percent): C, 37.07; H, 8.14; N, 13.05; Cl, 10.71; mol weight 690 (benzene).

(IV) 3.3 g. tetrameric product; B.P. 277–281° C./0.05 mm. yellow, viscous oil, $n_D^{20}$ 1.4910.

Analysis.—$C_{26}H_{70}N_8Si_9Cl_2$ calc'd (percent): C, 38.15; H, 8.62; N, 13.69; Cl, 8.66; mol weight 818.6. Found (percent): C, 38.27; H, 8.36; N, 13.49; Cl, 8.76; mol weight 798.

In the following table the distribution of the monomer and oligomers is shown in percent. The molar proportions of ethylenediamine and dimethyldichlorosilane have been varied. The same procedure as described in Example 1 has been used. After the benzene has been completely removed, the residue is calculated as being 100%. The missing quantity to give a 100% yield after the fractionation is due to higher oligomers having $n=6$ and greater. By decreasing the amount of dimethyldichlorosilane with respect to ethylenediamine the amount of higher oligomers increases as is evident from the table. The higher oligomers undergo further condensation upon distillation. A partial separation is possible by e.g. fractional precipitation.

| Ethylenediamine/ dimethyldichloro- silane, Molar Ratio | 1,3-bis-(dimethylchlorosilyl-1,3,2-diazasilacyclopentane, percent yield [1] | | | | |
| --- | --- | --- | --- | --- | --- |
| | $n=1$ | $n=2$ | $n=3$ | $n=4$ | $n=5$ |
| 1:1 | 77.0 | 21.7 | | | |
| 1:0.833 | 19.9 | 46.4 | 18.0 | 3.3 | |
| 1:0.777 | 11.3 | 28.1 | 42.9 | 10.8 | 2.5 |
| 1:0.750 | 10.8 | 19.8 | 23.8 | 34.2 | 8.6 |
| 1:0.733 | 3.4 | 8.5 | 15.3 | 25.7 | 29.2 |

[1] Averages of 2 runs.

In order to get as much as possible of the monomer ($n=1$) it is expedient to use an excess of the halosilane, e.g. a molar ratio of 1:2.

(V) Pentameric product; B.P. 304–308° C./0.06 mm.; brown wax-like substance, crystallizes partly.

Analysis.—$C_{32}H_{86}N_{10}Cl_2Si_{11}$ calc'd (percent): C, 38.87; H, 8.75; N, 14.13; mol weight 991.0. Found (percent): C, 37.27; H, 8.52; N, 14.39; mol weight 965.

EXAMPLE 2

To 60.1 g. (1 mole) of ethylene diamine dissolved in 800 ml. of benzene are added by drops at room temperature 253.2 g. (1 mole) of diphenyldichlorosilane dissolved in 200 ml. of benzene and the reaction mixture is refluxed for 2 hours. The chlorohydrate is filtered off. Upon having removed the benzene there remains a yellowish polymeric residue which is heated with 100 g. of diphenyldichlorosilane at 150° to 200° C. until the separation of the chlorohydrate is complete (about 30 minutes.). The cooled mixture is boiled with 300 to 400 ml. of benzene and the hydrochloride filtered off. The filtrate is concentrated until crystals precipitate. Hexane is added and the crystals are separated.

Yield 220.7 g. (98%); M.P. 218–20° C. (recrystallized in hexane).

What I claim is:

1. A process for preparing 1,3-disilyl-1,3,2-diazasilacycloalkanes of the formula

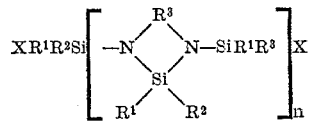

wherein $R^1$ and $R^2$ taken singly are hydrogen atoms, fluorine atoms, hydrocarbon groups or silyl groups which can be attached to the silicon atoms through oxygen atoms, $R^3$ a divalent hydrocarbon group or ether group attached to the nitrogen atoms through carbon in 1,2- or 1,3-position for aliphatics, or ortho- or peri-positions for cyclic $R^3$ groups, $n$ is an integer from 1 to 10, and X is a chlorine or bromine atom, comprising step 1 of reacting a diamine of the formula $H_2N$—$R^3$—$NH_2$ where $R^3$ is as defined hereinabove with a halosilane of the formula $R^1R^2SiX_2$ where $R^1$, $R^2$ and X are as defined hereinabove, using a molar ratio of about 1.0: 0.5 diamine to halosilane, then heating the reaction mixture at a higher temperature to finish the first step of the reaction, and step 2 of adding an additional amount of the halosilane to give about a 1:1 molar ratio, then heating the reaction mixture to complete the reaction.

2. A process of claim 1 wherein the reaction of step 1 is carried out using an inert solvent for the reaction mixture.

3. A process of claim 1 wherein the reactants in step 1 are mixed at a temperature below 100° C., then heated at a temperature higher than the mixing temperature in the range of 60 to 130° C.; and, in step 2 heating the reaction mixture in the range of 60 to 250° C. to complete the reaction.

4. A process of claim 1 wherein $R^1$ and $R^2$ are hydrocarbon groups and $R^3$ is a divalent hydrocarbon group.

5. A process of claim 1 wherein $R^1$ and $R^2$ are methyl groups, $R^3$ is —$CH_2CH_2$— and the X's are chlorine atoms.

6. A 1,3-disilyl-1,3,2-diazasilacycloalkane of the formula

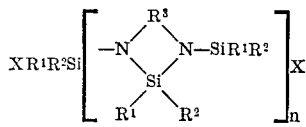

wherein $R^1$ and $R^2$ taken singly are hydrogen atoms, fluorine atoms, hydrocarbon groups or silyl groups, which can be attached to the silicon atoms through oxygen atoms, $R^3$ is a divalent hydrocarbon group or ether group attached to the nitrogen atoms through carbon in 1,2- or 1,3-position for aliphatics or ortho- or peri-positions for cyclic $R^3$ groups, $n$ is an integer from 1 to 10, provided when $n$ is 1 not all of $R^1$, $R^2$ and $R^3$ are lower alkyl or lower alkylene, and X is a chlorine or bromine atom.

7. A diazasilacycloalkane of claim 6 wherein $R^1$ and $R^2$ are hydrocarbon groups and $R^3$ is a divalent hydrocarbon group.

8. A diazasilacycloalkane of claim 6 wherein $R^1$ and $R^2$ are phenyl groups, $R^3$ is —$CH_2CH_2$— and the X's are chlorine atoms.

9. A diazasilacycloalkane of claim 6 wherein $R^1$ and $R^2$ are methyl groups, $R^3$ is —$CH_2CH_2$—, $n$ is at least 2 and the X's are chlorine atoms.

References Cited
UNITED STATES PATENTS

| | | | |
|---|---|---|---|
| 3,098,830 | 7/1963 | Rochow | 260—448.2 XR |
| 3,297,592 | 1/1967 | Fink | 260—448.2 XR |
| 3,354,098 | 11/1967 | Byrd | 260—448.2 XR |

TOBIAS E. LEVOW, Primary Examiner

W. F. W. BELLAMY, Assistant Examiner

U.S. Cl. X.R.

252—49.7, 74; 260—46.5

PO-1050
(5/69)

UNITED STATES PATENT OFFICE
CERTIFICATE OF CORRECTION

Patent No. 3,509,194                    Dated April 28, 1970

Inventor(s) Walter Fink

It is certified that error appears in the above-identified patent and that said Letters Patent are hereby corrected as shown below:

Column 1, line 15 that portion of the formula in the Abstract reading $"N-SiR^1R_2)_nX"$ should read ---$"N-SiR^1R^2)_nX"$-----

Column 3, line 61 the word "be" should be deleted.

Column 5, line 27 the words "biphenyl or naphthyl" should be deleted.

Column 6, lines 38, 39, 40 and 41 the letters in the formula written as a "Q" should be a "B" in every instance.

Column 8, Claim 1, the part of the formula in brackets on the right which reads $"N-SiR^1R^3"$ should read ------$"N-SiR^1R^2"$--------

Signed and sealed this 13th day of June 1972.

(SEAL)
Attest:

EDWARD M. FLETCHER, JR.                ROBERT GOTTSCHALK
Attesting Officer                      Commissioner of Patents